United States Patent
Yau et al.

(10) Patent No.: US 11,018,593 B1
(45) Date of Patent: May 25, 2021

(54) DUAL-MODE ACTIVE CLAMP FLYBACK CONVERTER

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: Asian Power Devices Inc., Taoyuan (TW)

(*) Notice: Subject to any disclaimer, the term of this patent is extended or adjusted under 35 U.S.C. 154(b) by 0 days.

(21) Appl. No.: 16/718,680

(22) Filed: Dec. 18, 2019

(30) Foreign Application Priority Data

Nov. 22, 2019 (TW) ................ 10814263.9

(51) Int. Cl.
*H02M 3/335* (2006.01)
*H02M 1/08* (2006.01)
*H02M 1/00* (2006.01)

(52) U.S. Cl.
CPC ....... *H02M 3/33569* (2013.01); *H02M 1/083* (2013.01); *H02M 3/33507* (2013.01); *H02M 2001/0048* (2013.01)

(58) Field of Classification Search
CPC .. H02M 3/325; H02M 3/335; H02M 3/33569; H02M 3/33507; H02M 3/33515; H02M 1/08; H02M 1/083; H02M 2001/0048; H02M 2001/0051; H02M 2001/00521
See application file for complete search history.

(56) References Cited

U.S. PATENT DOCUMENTS

| | | | |
|---|---|---|---|
| 9,124,182 B2 * | 9/2015 | Chen | H02M 3/33507 |
| 9,991,803 B1 * | 6/2018 | Wang | H02M 1/44 |
| 10,069,426 B2 * | 9/2018 | Rana | H02M 3/33569 |
| 10,177,670 B1 | 1/2019 | Lin et al. | |
| 10,651,746 B2 | 5/2020 | Song et al. | |
| 2015/0131341 A1 * | 5/2015 | Koo | H02M 3/33569 363/21.13 |
| 2016/0365801 A1 * | 12/2016 | Phadke | H02M 1/34 |

(Continued)

FOREIGN PATENT DOCUMENTS

| | | |
|---|---|---|
| TW | M557846 U | 4/2018 |
| TW | 201818642 A | 5/2018 |

(Continued)

OTHER PUBLICATIONS

TW Office Action issued in corresponding TW Patent Application No. 108142639 dated Mar. 18, 2020.

*Primary Examiner* — Adolf D Berhane

(74) *Attorney, Agent, or Firm* — Muncy, Geissler, Olds & Lowe, P.C.

(57) ABSTRACT

A dual-mode active clamp flyback converter includes a transformer circuit, a clamping energy storage circuit, and a main switch circuit. The transformer circuit is coupled to a load, and the transformer circuit includes an auxiliary winding. The clamping energy storage circuit is coupled to the transformer circuit. If the load as a heavy loading, the clamping energy storage circuit is turned on. If the load as a light loading, the clamping energy storage circuit is turned off. The main switch circuit is coupled to the transformer circuit. When the main switch circuit is turned on, the auxiliary winding releases energy to a primary-side winding of the transformer circuit.

8 Claims, 14 Drawing Sheets

(56) References Cited

U.S. PATENT DOCUMENTS

| | | | | |
|---|---|---|---|---|
| 2017/0346405 A1 | 11/2017 | Lin et al. | | |
| 2018/0062529 A1* | 3/2018 | Song | ................ | H02M 3/33507 |
| 2018/0069480 A1* | 3/2018 | Koo | ................ | H02M 1/08 |
| 2018/0102709 A1* | 4/2018 | Hari | ................ | H02M 1/126 |
| 2018/0287481 A1* | 10/2018 | Liu | ................ | H02M 3/156 |
| 2019/0140550 A1* | 5/2019 | Song | ................ | H02M 3/33507 |
| 2020/0091826 A1* | 3/2020 | Yang | ................ | H02M 3/33523 |

FOREIGN PATENT DOCUMENTS

| | | |
|---|---|---|
| TW | 201826676 A | 7/2018 |
| TW | 201918004 A | 5/2019 |

\* cited by examiner

DUAL-MODE ACTIVE CLAMP FLYBACK CONVERTER

BACKGROUND

Technical Field

The present disclosure relates to an active clamp flyback converter, and more particularly to a dual-mode active clamp flyback converter that can automatically switch operating modes to optimize conversion efficiency for heavy loading or light loading.

Description of Related Art

The statements in this section merely provide background information related to the present disclosure and do not necessarily constitute prior art.

Conventional flyback converters are widely used in power conversion systems suitable for low-to-medium-power because of their circuit has simple architecture. The flyback converters have advantages of electrical isolation and output voltage adjustable by ratio of winding. There is a leakage inductance in the transformer. When a switch is turned on and the magnetized inductance of primary-side store energy, the leakage inductance will also be stored energy. When the switch is turned off and the magnetizing inductance starts to release energy to secondary-side, if no release path for stored energy of the leakage inductance, the leakage inductance may release energy to a capacitor of the switch, which will cause the output voltage to rise sharply and may appear a high voltage spike, and which will cause damage to the switch. In recent years, in order to solve the above problems, a technology of active clamping has been proposed successively.

However, a conventional active clamp flyback (ACF) converters has higher conversion efficiency when that operates under a condition with low voltage and heavy loading. But when the conventional ACF converter is operated at high voltage and light load, the conversion efficiency is significantly lower than that of a passive lossless shock absorber flyback converter. Furthermore, although the conventional flyback converter with leakage inductance energy recovery winding has higher conversion efficiency when that operates under a condition with high voltage and light loading, but the conversion efficiency is significantly lower than that of the ACF converter when operating under a condition with low voltage and heavy loading.

Therefore, how to design a dual-mode active clamp flyback converter to solve the technical problems above is an important subject studied by the inventors and proposed in the present disclosure. In particular, solving the technical problem that it is difficult to improve the conversion efficiency.

SUMMARY

The purpose of the present disclosure is to provide a dual-mode active clamp flyback converter, which can automatically switch operating modes for optimized efficiency in response to heavy loading or light loading to solve the technical problem that it is difficult to improve the conversion efficiency, and achieve the purpose of convenient operation, improve conversion efficiency and save power consumption costs.

In order to achieve the purpose above-mentioned, the dual-mode active clamp flyback converter includes a transformer circuit, a clamping energy storage circuit and a main switch circuit. The transformer circuit is coupled to a load, and the transformer circuit including an auxiliary winding. The clamping energy storage circuit is coupled to the transformer circuit, if the load as a heavy loading, the clamping energy storage circuit turns on, and if the load as a light loading, the clamping energy storage circuit turns off. The main switch circuit is coupled to the transformer circuit, when the main switch circuit turns on, the auxiliary winding releases energy to a primary-side winding of the transformer circuit. After the clamping energy storage circuit turns on and then turns off, the main switch circuit enters a zero-voltage switching mode.

Further, under a condition that inputting a fixed voltage to the transformer circuit, a turning point of a conversion efficiency obtained according to a conversion efficiency ratio of the load coupled to the transformer circuit, when a value of an actual output power is less than a value of an output power corresponding to the turning point of the conversion efficiency, the load as the light loading, when the value of the actual output power is greater than the value of the output power corresponding to the turning point of the conversion efficiency, the load as the heavy loading.

Further, the transformer circuit further includes a secondary-side winding coupled to the load, the primary-side winding is coupled in parallel to a magnetizing inductance of the transformer circuit, and coupled to an input voltage through a leakage inductance of the transformer circuit.

Further, the clamping energy storage circuit includes an auxiliary switch, a clamping capacitor, and a diode that are coupled to each other, the auxiliary switch is coupled to the input voltage and the leakage inductance, the clamping capacitor is coupled to the magnetizing inductance, the primary-side winding, and the main switch circuit, and the diode is coupled to the auxiliary winding.

Further, the main switch circuit includes a main switch, one end of the main switch is coupled to the primary-side winding, the magnetizing inductance, and the clamping capacitor, the other end of the main switch is coupled to the auxiliary winding and the input voltage.

Further, when the auxiliary switch turns off and the main switch turns on, the input voltage, the leakage inductance, the primary-side winding, and the main switch constitute a first loop, the input voltage, the leakage inductance, the primary-side winding, the clamping capacitor, the diode and the auxiliary winding constitute a second loop, if the clamping capacitor has temporarily stored energy from the leakage inductance, the clamping capacitor, the main switch, the auxiliary winding, and the diode constitute a third loop; in the first loop, the leakage inductance performs energy storage, and the magnetizing inductance performs magnetization; in the second loop, the magnetizing inductance performs magnetization; in the third loop, the clamping capacitor releases energy to the primary-side winding through the auxiliary winding.

Further, when the auxiliary switch and the main switch turn off, the leakage inductance, the primary-side winding, the clamping capacitor, and a body diode parasitic to the auxiliary switch constitute a fourth loop, in the fourth loop, the leakage inductance performs energy release, and the magnetizing inductance performs demagnetization.

Further, if the load as the heavy loading, after the fourth loop is constituted, the auxiliary switch is turned on and the main switch is turned off, the leakage inductance, the primary-side winding, the clamping capacitor, and the auxiliary switch constitute a fifth loop, in the fifth loop, the leakage inductance performs energy storage, and the magnetizing inductance performs demagnetization.

Further, if the load as the heavy loading, after the fifth loop is constituted, the auxiliary switch and the main switch are turned off, the input voltage, the leakage inductance, the primary-side winding, and a body diode parasitic to the main switch constitute a sixth loop, in the sixth loop, the leakage inductance performs energy release.

Further, if the load as the heavy loading, after the sixth loop is constituted, the auxiliary switch is turned off and the main switch is turned on, and then the second loop and the third loop are constituted.

Further, if the load as the light loading, after the fourth loop is constituted, the auxiliary switch and the main switch are turned off, and then the first loop and the third loop are constituted.

When the dual-mode active clamp flyback converter of the present disclosure is used, first determine whether the load is light loading or heavy loading. If the load is light loading, the clamping energy storage circuit is kept turning off, so the light loading operates in a simple energy recovery action, that is, the auxiliary winding releases energy to the primary-side winding of the transformer circuit, which can reduce switching frequencies of the main switch circuit when it operate in valley switching valley voltage switching (VVS) (i.e., fixed frequency modulation mode, FFM mode) to achieve the best conversion efficiency at light loading. If the load is heavy loading, the clamping energy storage circuit enters an active clamp forward (ACF) mode, that is, the clamping energy storage circuit can be turned on and then be turned off, so that the main switch circuit operates the zero-voltage switching (ZVS) mode for the best conversion efficiency in heavy loading. For this reason, the dual-mode active clamp flyback converter of the present disclosure can automatically switch operating modes for optimized efficiency in response to heavy loading or light loading to solve the technical problem that it is difficult to improve the conversion efficiency, and achieve the purpose of convenient operation, improve conversion efficiency and save power consumption costs.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
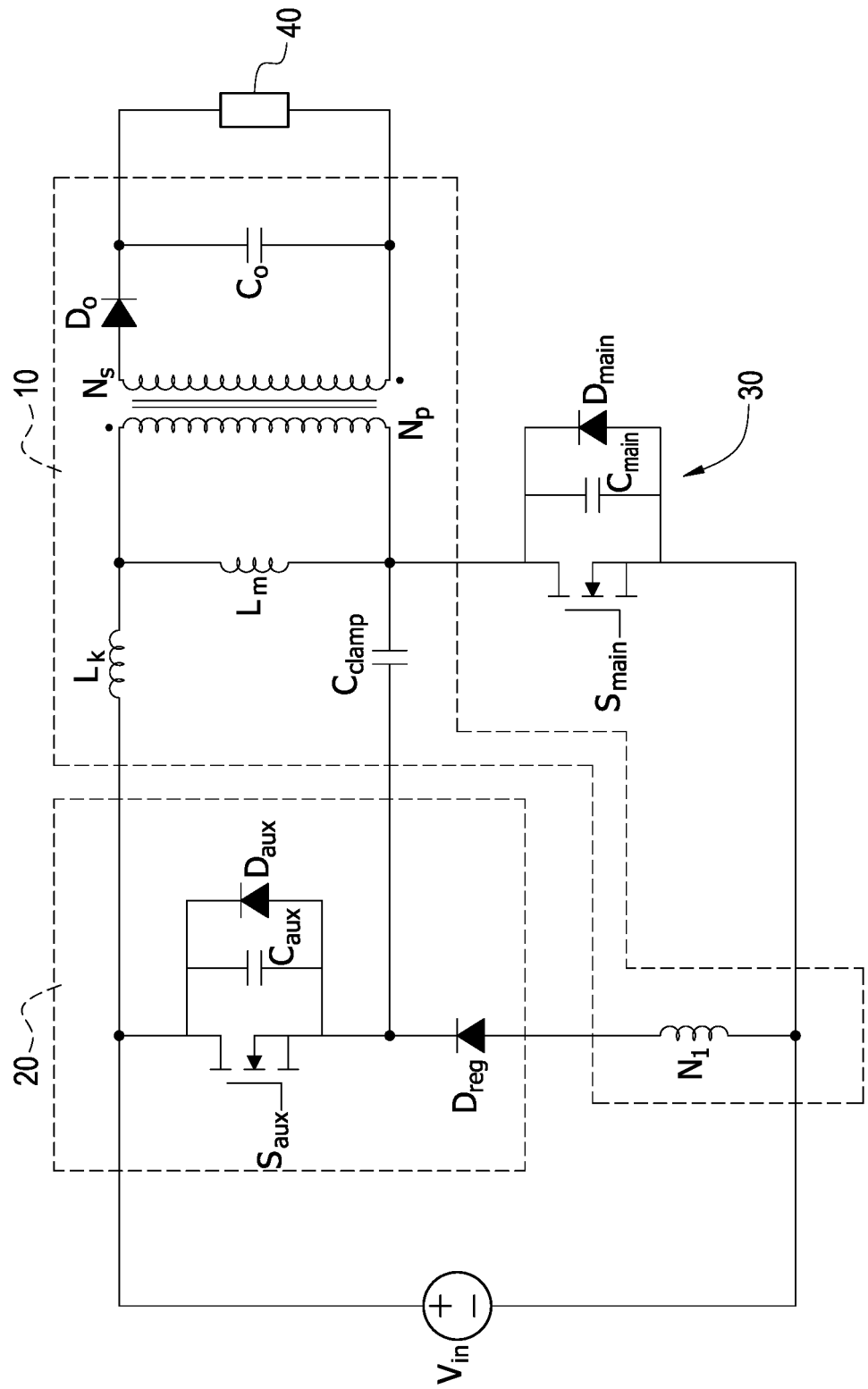
FIG. 1 is a schematic circuit diagram of a dual-mode active clamp flyback converter of the present disclosure.

The embodiments of the present disclosure are described by way of specific examples, and those skilled in the art can readily appreciate the other advantages and functions of the present disclosure. The present disclosure may be embodied or applied in various other specific embodiments, and various modifications and changes can be made without departing from the spirit and scope of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that can be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Please refer to FIG. 1, the FIG. 1 is a schematic circuit diagram of a dual-mode active clamp flyback converter of the present disclosure. A dual-mode active clamp flyback converter of the present disclosure includes a transformer circuit 10, a clamping energy storage circuit 20 and a main switch circuit 30. The transformer circuit 10 is coupled to a load 40, and the transformer circuit 10 includes an auxiliary winding $N_1$ and a secondary-side winding $N_s$ coupled to the load 40. A primary-side winding $N_p$ is coupled in parallel to a magnetizing inductance $L_m$ of the transformer circuit 10, and is coupled to the magnetizing inductance $L_m$ of the transformer circuit 10, and is coupled to an input voltage $V_{in}$ through a leakage inductance $L_k$ of the transformer circuit 10. In the present disclosure, the load 40 is coupled to an output diode $D_o$ and an output capacitor $C_o$.

The clamping energy storage circuit 20 is coupled to the transformer circuit 10. If the load 40 as a heavy loading, the clamping energy storage circuit 20 turns on then turn off, and if the load 40 as a light loading, the clamping energy storage circuit 20 is kept turning off. Further, the clamping energy storage circuit 20 includes an auxiliary switch $S_{aux}$, a clamping capacitor $C_{clamp}$, and a diode $D_{reg}$ that are coupled to each other. The auxiliary switch $S_{aux}$ is coupled to the input voltage $V_{in}$ and the leakage inductance $L_k$, the clamping capacitor $C_{clamp}$ is coupled to the magnetizing inductance $L_m$, the primary-side winding $N_p$, and the main switch circuit 30, and the diode $D_{reg}$ is coupled to the auxiliary winding $N_l$.

The main switch circuit 30 is coupled to the transformer circuit 10, when the main switch circuit 30 is turned on, the auxiliary winding $N_l$ releases energy to the primary-side winding $N_p$ of the transformer circuit 10. After the clamping energy storage circuit 20 turns on and then turns off, the main switch circuit 30 enters a zero-voltage switching (ZVS) mode. The main switch circuit 30 includes a main switch $S_{main}$, one end of the main switch $S_{main}$ is coupled to the primary-side winding $N_p$, the magnetizing inductance $L_m$, and the clamping capacitor $C_{clamp}$, the other end of the main switch $S_{main}$ is coupled to the auxiliary winding $N_l$ and the input voltage $V_{in}$.

Figure 2:
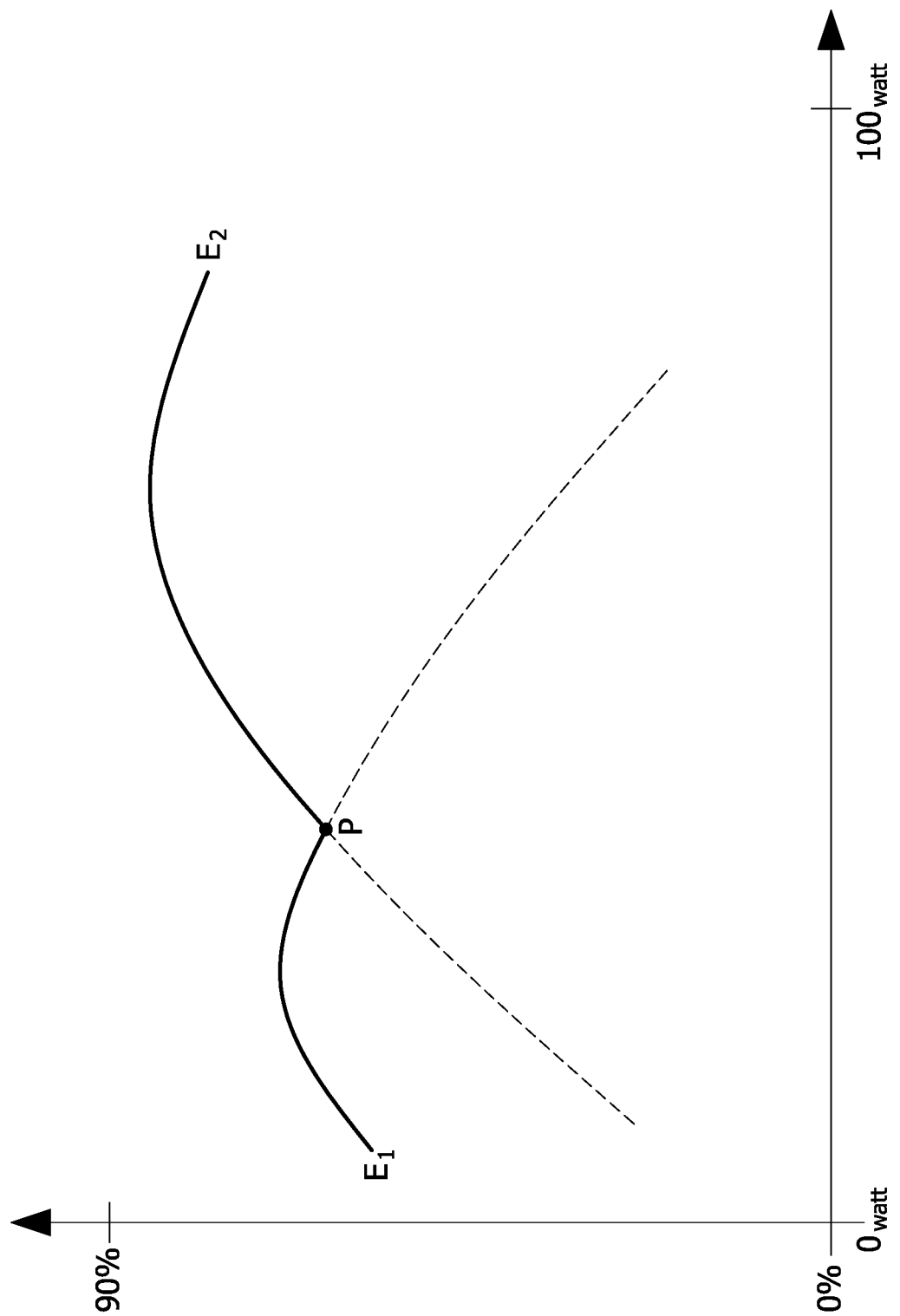
FIG. 2 is a schematic diagram of the conversion efficiency of the dual-mode active clamp flyback converter of the present disclosure.

Please refer to FIG. 1 and FIG. 2, the FIG. 2 is a schematic diagram of the conversion efficiency of the dual-mode active clamp flyback converter of the present disclosure. Under a condition that inputting a fixed voltage (i.e., $V_{in}$) to the transformer circuit 10, a turning point P of a conversion efficiency can be obtained according to a conversion efficiency ratio of the load 40 coupled to the transformer circuit 10. That is, a relationship curve E1 between conversion efficiency and output power (unit: watt) obtained when the load 40 is operated in a light loading mode, and a relationship curve E2 between conversion efficiency and output power obtained when the load 40 is operated in a heavy loading mode. The crossing point where E1 and E2 overlap with each other is the turning point P of conversion efficiency. When a value of an actual output power is less than a value of an output power corresponding to the turning point P of the conversion efficiency, the load 40 as the light loading, that is, the dual-mode active clamp flyback converter of the present disclosure operates in the light loading mode. When the value of the actual output power is greater than the value of the output power corresponding to the turning point P of the conversion efficiency, the load 40 as the heavy loading, that is, the dual-mode active clamp flyback converter of the present disclosure operates in the heavy loading mode. The dual-mode active clamp flyback converter of the present disclosure only operates on the real line portions of E1 and E2 as shown in FIG. 2 during the load 40 switching between the heavy loading mode or the light loading mode.

Please refer to FIG. 3 to FIG. 9, there are first state to seven state diagrams of the dual-mode active clamp flyback converter operating under heavy loading of the present disclosure.

Figure 3:
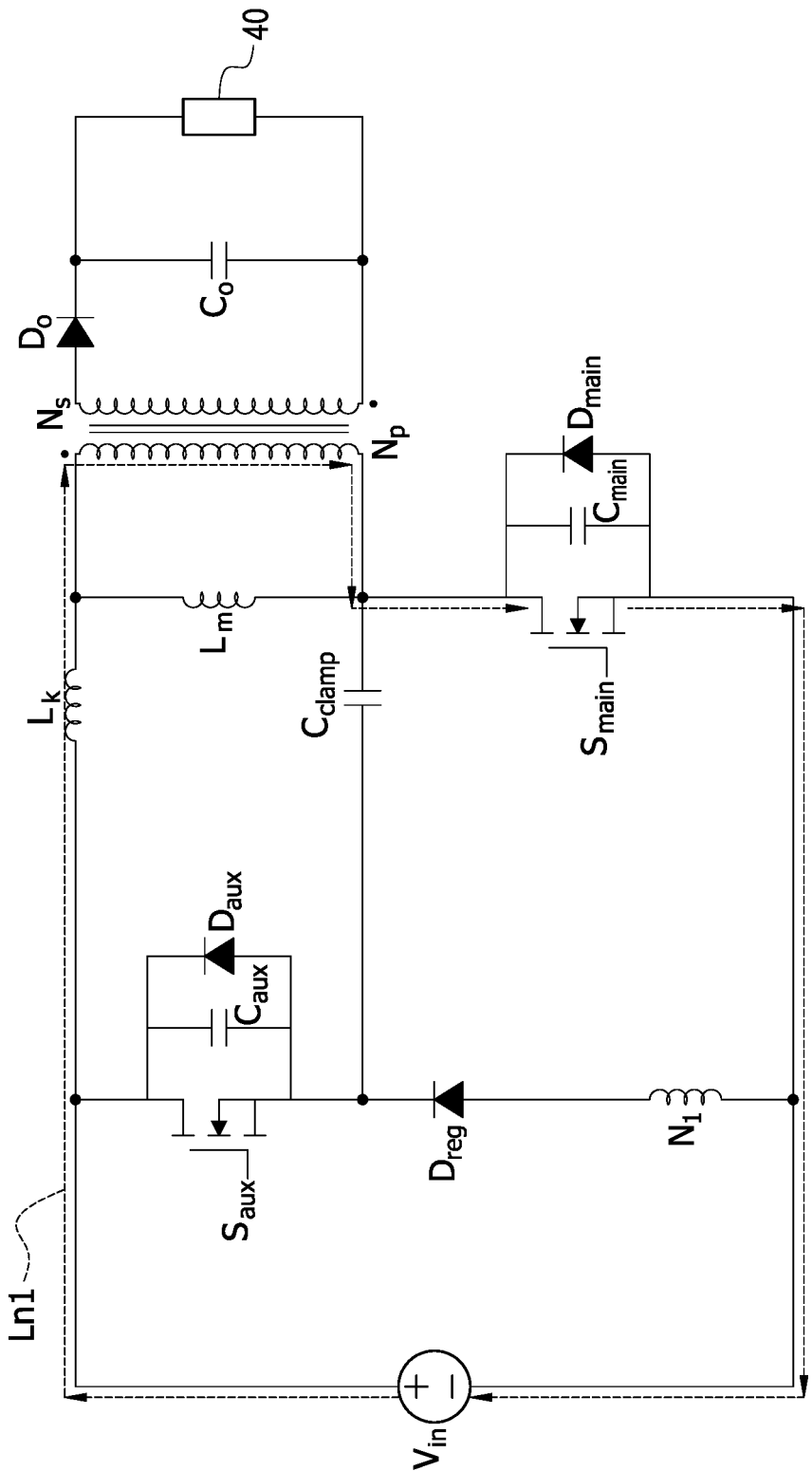
FIG. 3 is a first state diagram of the dual-mode active clamp flyback converter operating under heavy loading of the present disclosure.

As shown in FIG. 3, when dual-mode active clamp flyback converter in first state under heavy loading, the auxiliary switch $S_{aux}$ is turned off and the main switch $S_{main}$ is turned on. The input voltage $V_{in}$, the leakage inductance $L_k$, the primary-side winding $N_p$, and the main switch $S_{main}$ constitute a first loop $L_{n1}$. In the first loop $L_{n1}$, as the current flowing through the primary-side winding $N_p$ increases, the leakage inductance $L_k$ performs energy storage, and the magnetizing inductance $L_m$ performs magnetization.

Figure 4:
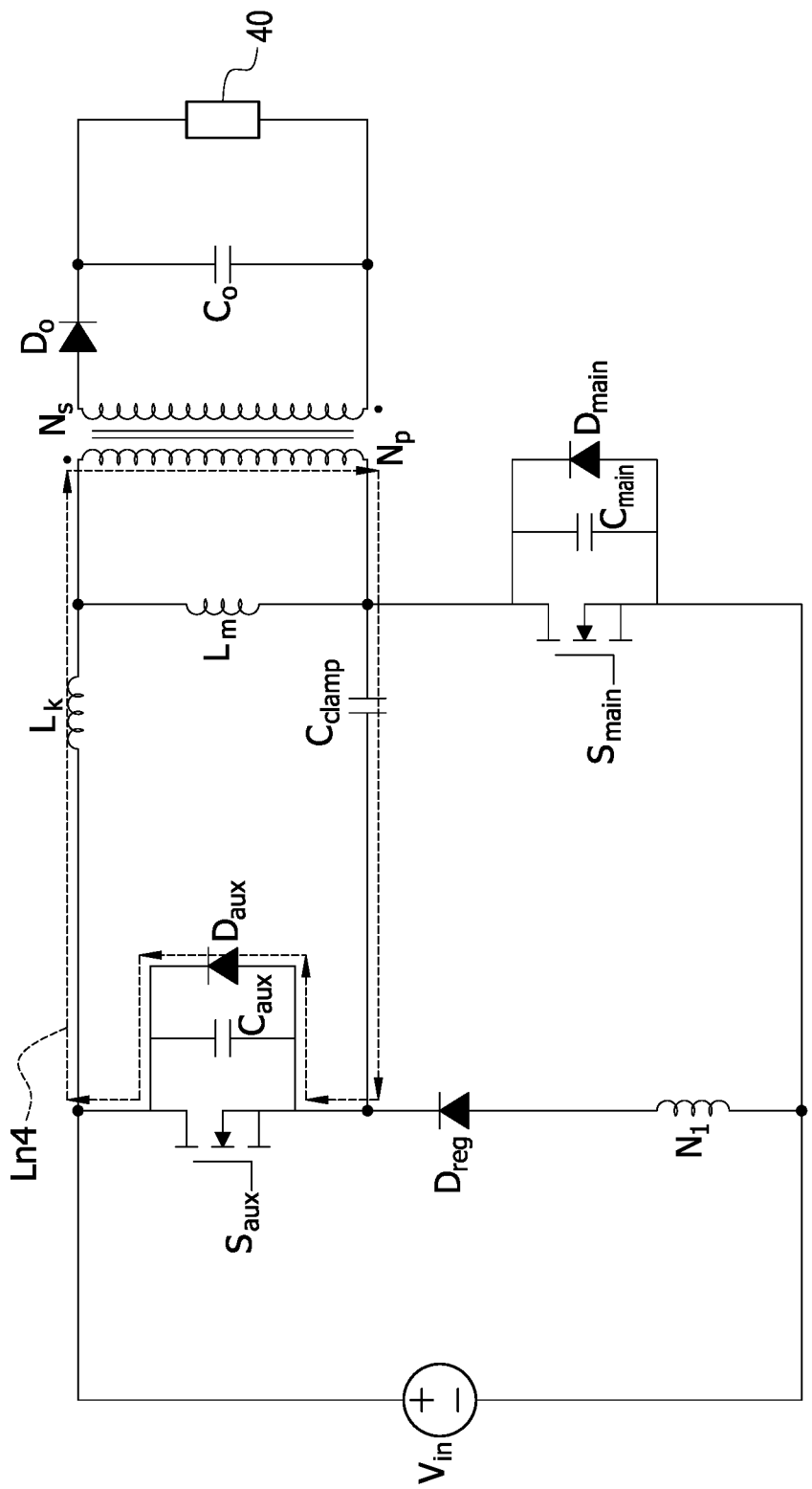
FIG. 4 is a second state diagram of the dual-mode active clamp flyback converter operating under heavy loading of the present disclosure.

As shown in FIG. 4, when dual-mode active clamp flyback converter in second state under heavy loading, the auxiliary switch $S_{aux}$ and the main switch $S_{main}$ are turned off. The leakage inductance $L_k$, the primary-side winding $N_p$, the clamping capacitor $C_{clamp}$, and a body diode $D_{aux}$ parasitic to the auxiliary switch $S_{aux}$ constitute a fourth loop $L_{n4}$. In the fourth loop $L_{n4}$, the leakage inductance $L_k$ performs energy release, and the magnetizing inductance $L_m$ performs demagnetization. Since the body diode $D_{aux}$ parasitic to the auxiliary switch $S_{aux}$ is turned on, a parasitic capacitance $C_{aux}$ parasitic to the auxiliary switch $S_{aux}$ is discharged. At this time, if the auxiliary switch $S_{aux}$ is turned on, zero-voltage switching (ZVS) of the auxiliary switch $S_{aux}$ can be realized.

Figure 5:
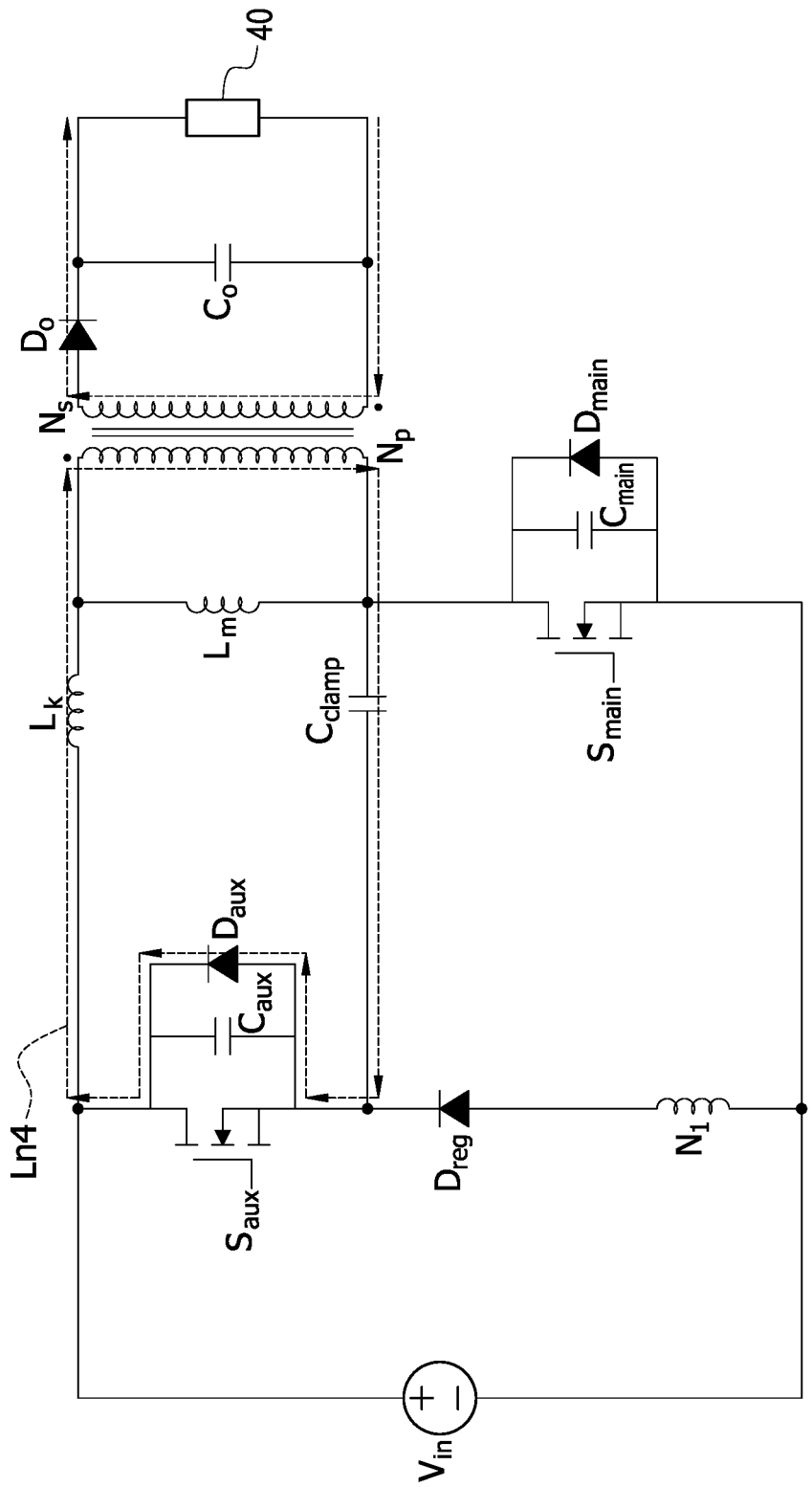
FIG. 5 is a third state diagram of the dual-mode active clamp flyback converter operating under heavy loading of the present disclosure.

As shown in FIG. 5, when dual-mode active clamp flyback converter in third state under heavy loading, it is substantially the same as the second state of heavy loading. The auxiliary switch $S_{aux}$ and the main switch $S_{main}$ are turned off. The leakage inductance $L_k$, the primary-side winding $N_p$, the clamping capacitor $C_{clamp}$, and a body diode $D_{aux}$ parasitic to the auxiliary switch $S_{aux}$ constitute a fourth loop $L_{n4}$. However, the magnetizing inductance $L_m$ starts to release energy to the secondary-side winding $N_s$. At this time, because the energy has been transferred to the secondary-side winding $N_s$, the output diode $D_o$ is turned on, and the output capacitor $C_o$ stores energy.

Figure 6:
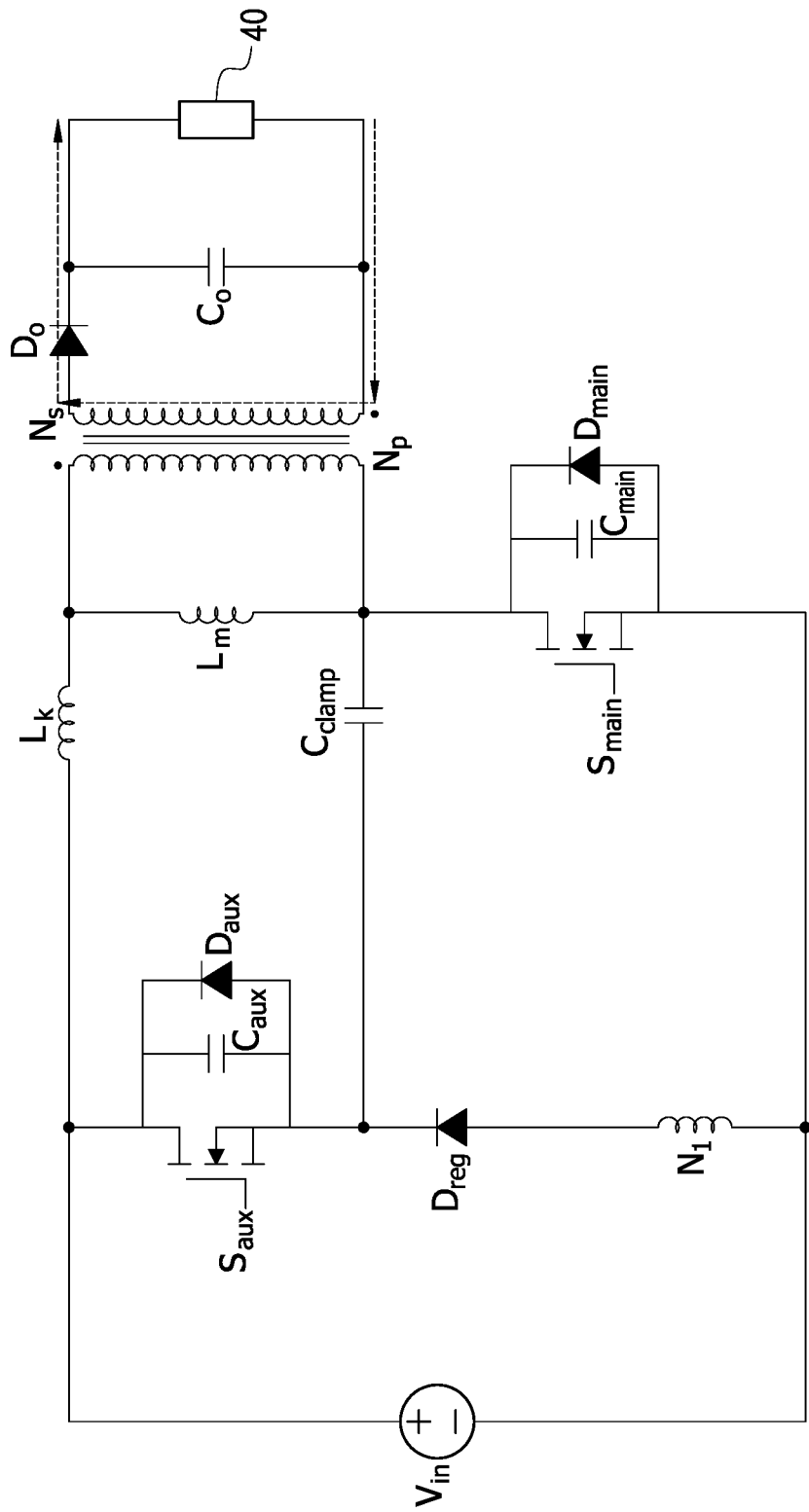
FIG. 6 is a fourth state diagram of the dual-mode active clamp flyback converter operating under heavy loading of the present disclosure.

As shown in FIG. 6, when dual-mode active clamp flyback converter in fourth state under heavy loading, it is substantially the same as the third state of heavy loading. The auxiliary switch $S_{aux}$ and the main switch $S_{main}$ are turned off. However, all energy of the leakage inductance $L_k$ is released, and the energy of the magnetizing inductance $L_m$ continues to release to the secondary-side winding $N_s$.

Figure 7:
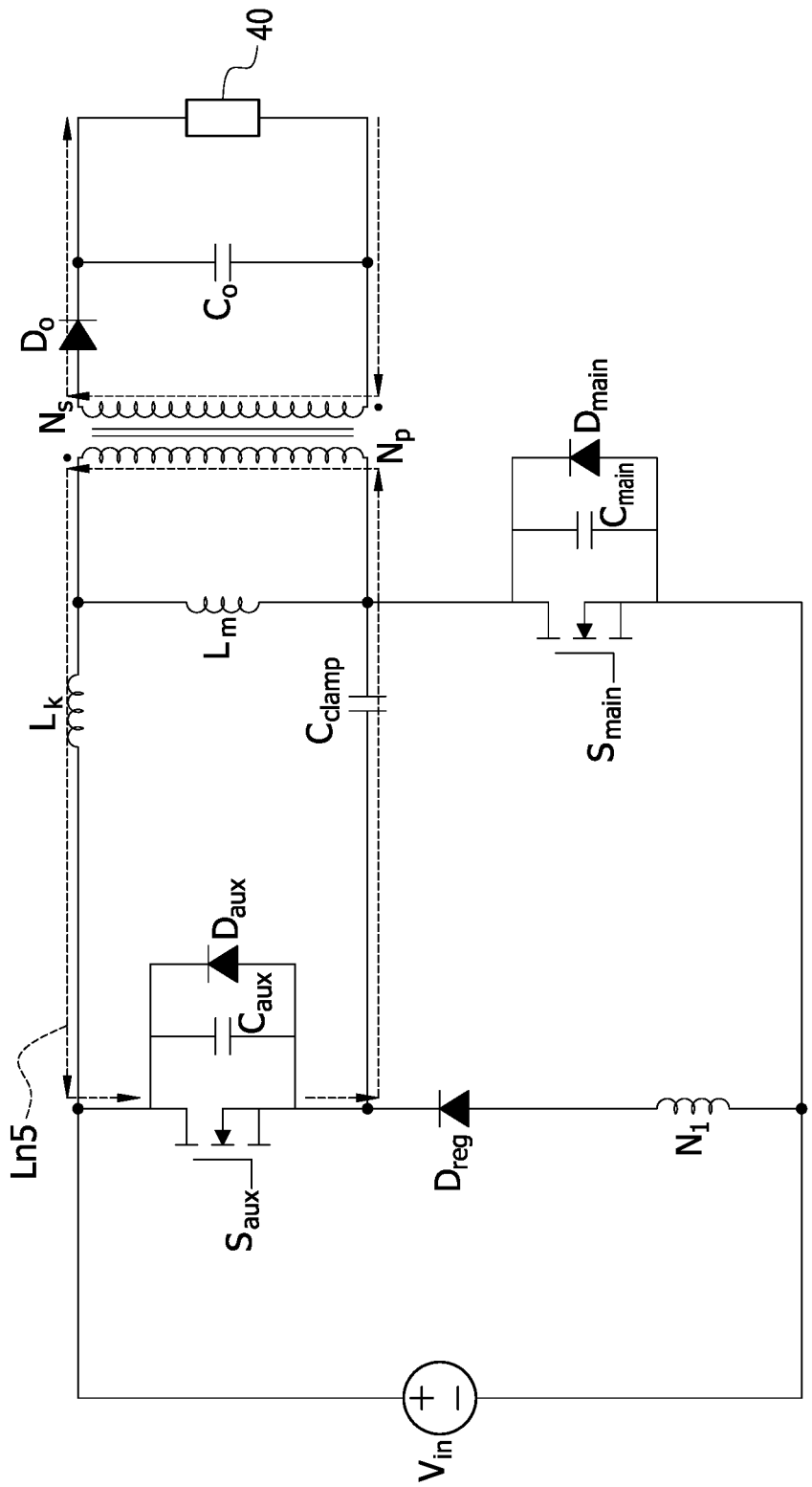
FIG. 7 is a fifth state diagram of the dual-mode active clamp flyback converter operating under heavy loading of the present disclosure.

As shown in FIG. 7, when dual-mode active clamp flyback converter in fifth state under heavy loading, after the fourth loop $L_{n4}$ is constituted, the auxiliary switch $S_{aux}$ is turned on and the main switch $S_{main}$ is turned off. The leakage inductance $L_k$, the primary-side winding $N_p$, the clamping capacitor $C_{clamp}$, and the auxiliary switch $S_{aux}$ constitute a fifth loop $L_{n5}$. In the fifth loop $L_{n5}$, the leakage inductance $L_k$ performs energy storage, and the magnetizing inductance $L_m$ performs demagnetization. At this time, the clamping capacitor $C_{clamp}$ returns energy to the leakage inductance $L_k$, and the current flowing through the leakage inductance $L_k$ is negative.

Figure 8:
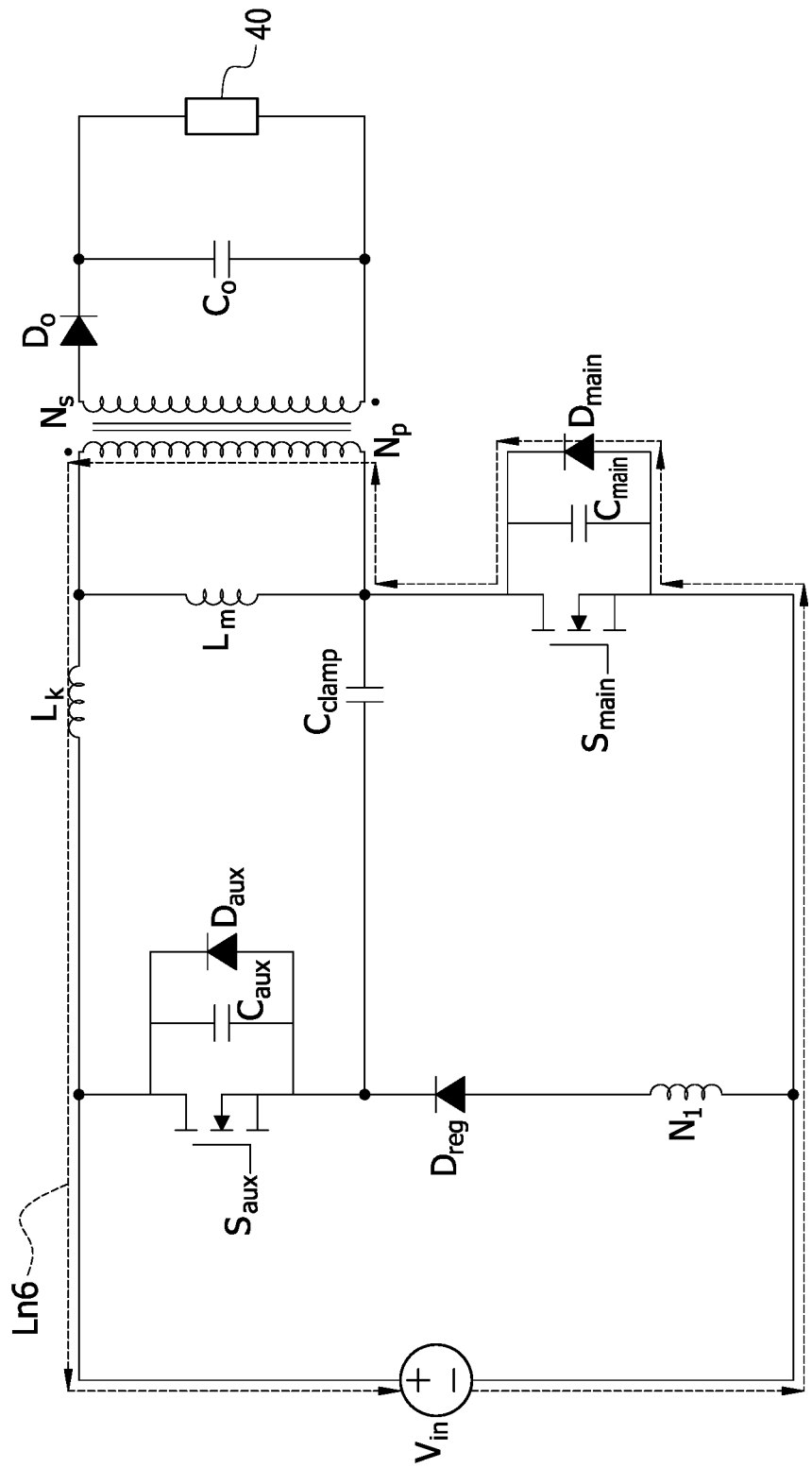
FIG. 8 is a sixth state diagram of the dual-mode active clamp flyback converter operating under heavy loading of the present disclosure.

As shown in FIG. 8, when dual-mode active clamp flyback converter in sixth state under heavy loading, after the fifth loop $L_{n5}$ is constituted, the auxiliary switch $S_{aux}$ and the main switch $S_{main}$ are turned off. The input voltage $V_{in}$, the leakage inductance $L_k$, the primary-side winding $N_p$, and a body diode $D_{main}$ parasitic to the main switch $S_{main}$ constitute a sixth loop $L_{n6}$. In the sixth loop $L_{n6}$, the leakage inductance $L_k$ performs energy release. At this time, the current of the leakage inductance $L_k$ is negative, and the leakage inductance $L_k$ releases energy in series resonance to the parasitic capacitance $C_{main}$ parasitic to the main switch $S_{main}$. The voltage of the parasitic capacitance $C_{main}$ starts to decrease until the current of the leakage inductance $L_k$ is cut off. The parasitic capacitance $C_{main}$ releases energy in an LC series resonance to the leakage inductance $L_k$ and the magnetizing inductance $L_m$, and then the voltage of the parasitic capacitance $C_{main}$ drops to zero. So, zero-voltage switching (ZVS) of the main switch $S_{main}$ can be realized.

Figure 9:
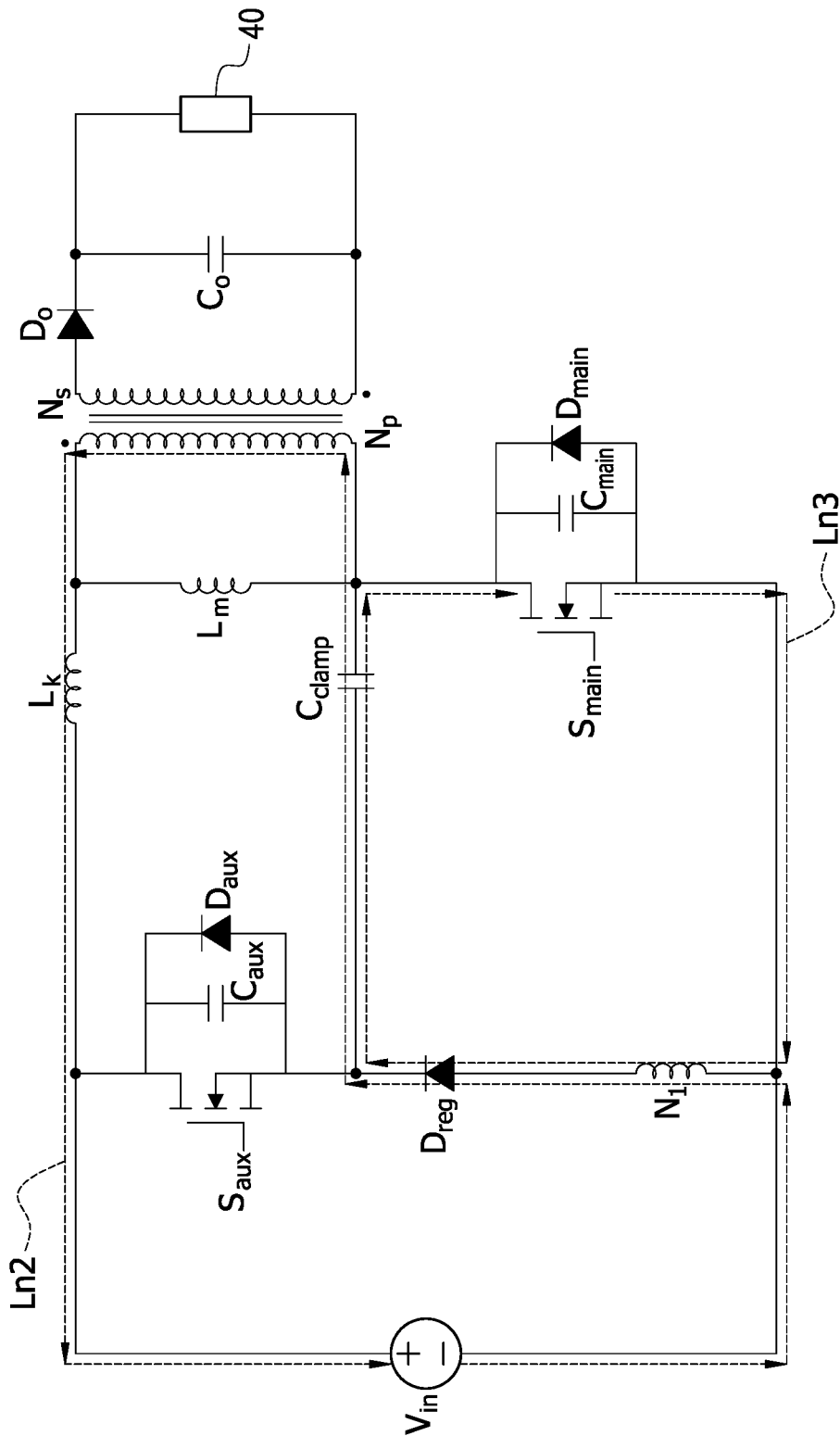
FIG. 9 is a seventh state diagram of the dual-mode active clamp flyback converter operating under heavy loading of the present disclosure.

As shown in FIG. 9, when dual-mode active clamp flyback converter in seventh state under heavy loading, after the sixth loop $L_{n6}$ is constituted, the auxiliary switch $S_{aux}$ is turned off and the main switch $S_{main}$ is turned on. The input voltage $V_{in}$, the leakage inductance $L_k$, the primary-side winding $N_p$, the clamping capacitor $C_{clamp}$, the diode $D_{reg}$ and the auxiliary winding $N_l$ constitute a second loop $L_{n2}$. If the clamping capacitor $C_{clamp}$ has temporarily stored energy from the leakage inductance $L_k$, the clamping capacitor $C_{clamp}$, the main switch $S_{main}$, the auxiliary winding $N_l$, and the diode $D_{reg}$ constitute a third loop $L_{n3}$. In the second loop $L_{n2}$, the magnetizing inductance $L_m$ performs magnetization. In the third loop $L_{n3}$, the clamping capacitor $C_{clamp}$ releases energy to the primary-side winding $N_p$ through the auxiliary winding $N_l$. That is, the energy of the leakage inductance $L_k$ temporarily stored in the clamping capacitor $C_{clamp}$ is transmitted to an input end of the transformer circuit 10.

Please refer to FIG. 10 to FIG. 14, there are first state to fifth state diagrams of the dual-mode active clamp flyback converter operating under light loading of the present disclosure.

Figure 10:
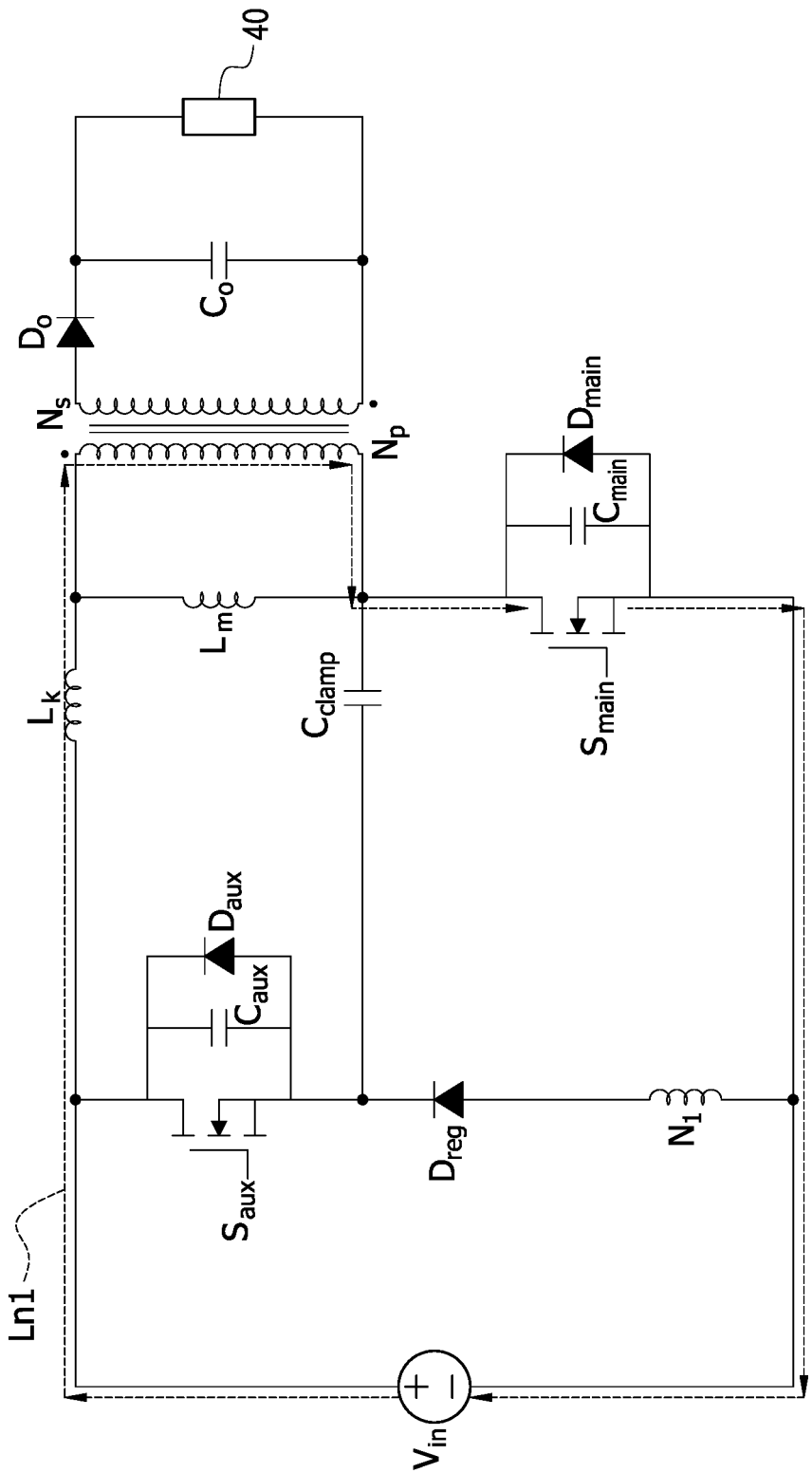
FIG. 10 is a first state diagram of the dual-mode active clamp flyback converter operating under light loading of the present disclosure.

As shown in FIG. 10, when dual-mode active clamp flyback converter in first state under light loading, the auxiliary switch $S_{aux}$ is turned off and the main switch $S_{main}$, is turned on. The input voltage $V_{in}$, the leakage inductance $L_k$, the primary-side winding $N_p$, and the main switch $S_{main}$ constitute the first loop $L_{n1}$. In the first loop $L_{n1}$, as the current flowing through the primary-side winding $N_p$ increases, the leakage inductance $L_k$ performs energy storage, and the magnetizing inductance $L_m$ performs magnetization.

Figure 11:
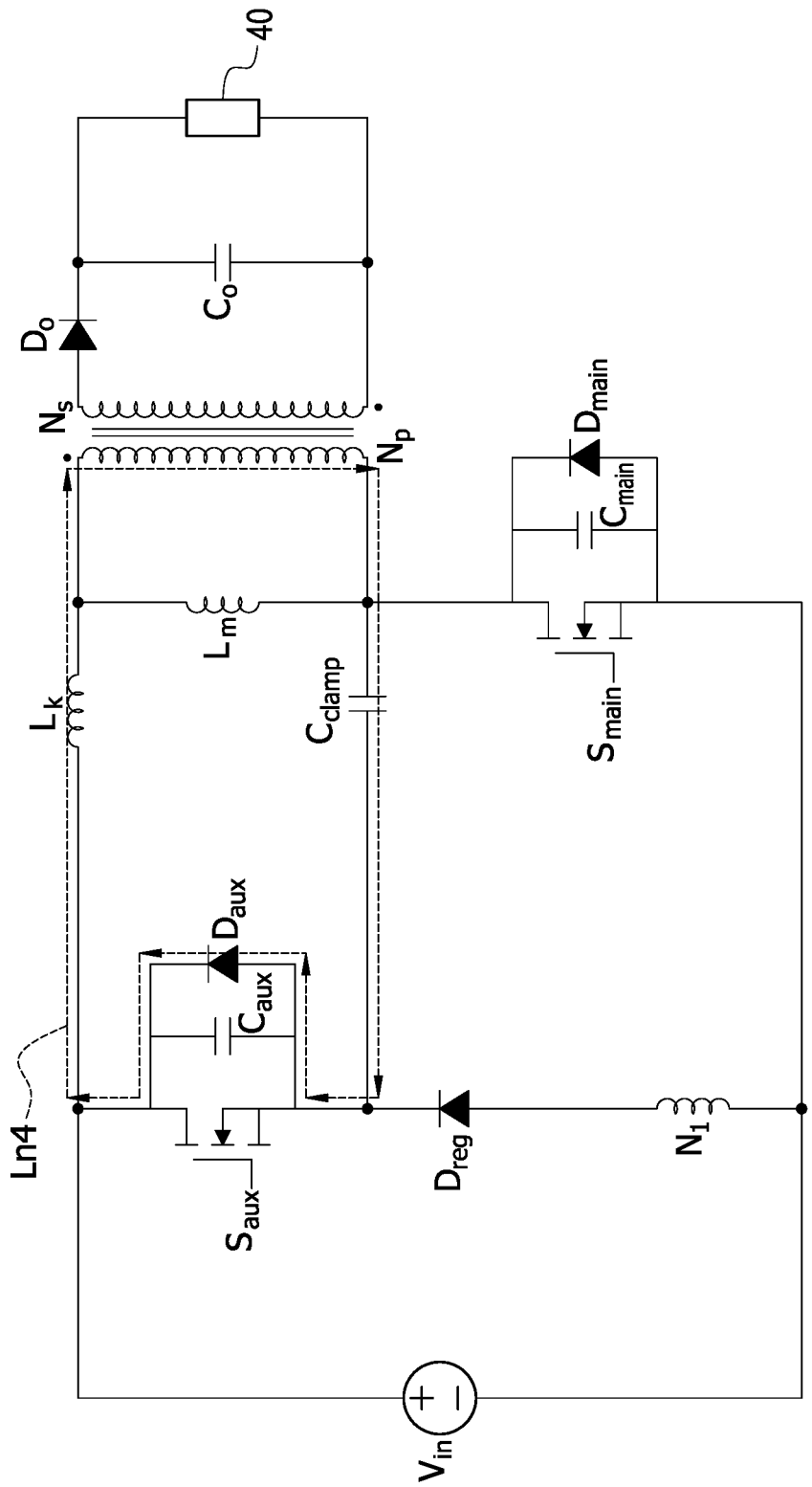
FIG. 11 is a second state diagram of the dual-mode active clamp flyback converter operating under light loading of the present disclosure.

As shown in FIG. 11, when dual-mode active clamp flyback converter in second state under light loading, the auxiliary switch $S_{aux}$ and the main switch $S_{main}$ are turned off. The leakage inductance $L_k$, the primary-side winding $N_p$, the clamping capacitor $C_{clamp}$, and a body diode $D_{aux}$ parasitic to the auxiliary switch $S_{aux}$ constitute a fourth loop $L_{n4}$. In the fourth loop $L_{n4}$, as the current of the leakage inductance $L_k$ flows through the clamping capacitor $C_{clamp}$ and the body diode $D_{aux}$ parasitic to the auxiliary switch $S_{aux}$, the leakage inductance $L_k$ releases energy and the magnetizing inductance $L_m$ performs demagnetization. Since the body diode $D_{aux}$ parasitic to the auxiliary switch $S_{aux}$ is turned on, the parasitic capacitance $C_{aux}$ parasitic to the auxiliary switch $S_{aux}$ is discharged. At this time, if the auxiliary switch $S_{aux}$ is turned on, zero-voltage switching (ZVS) of the auxiliary switch $S_{aux}$ can be realized.

Figure 12:
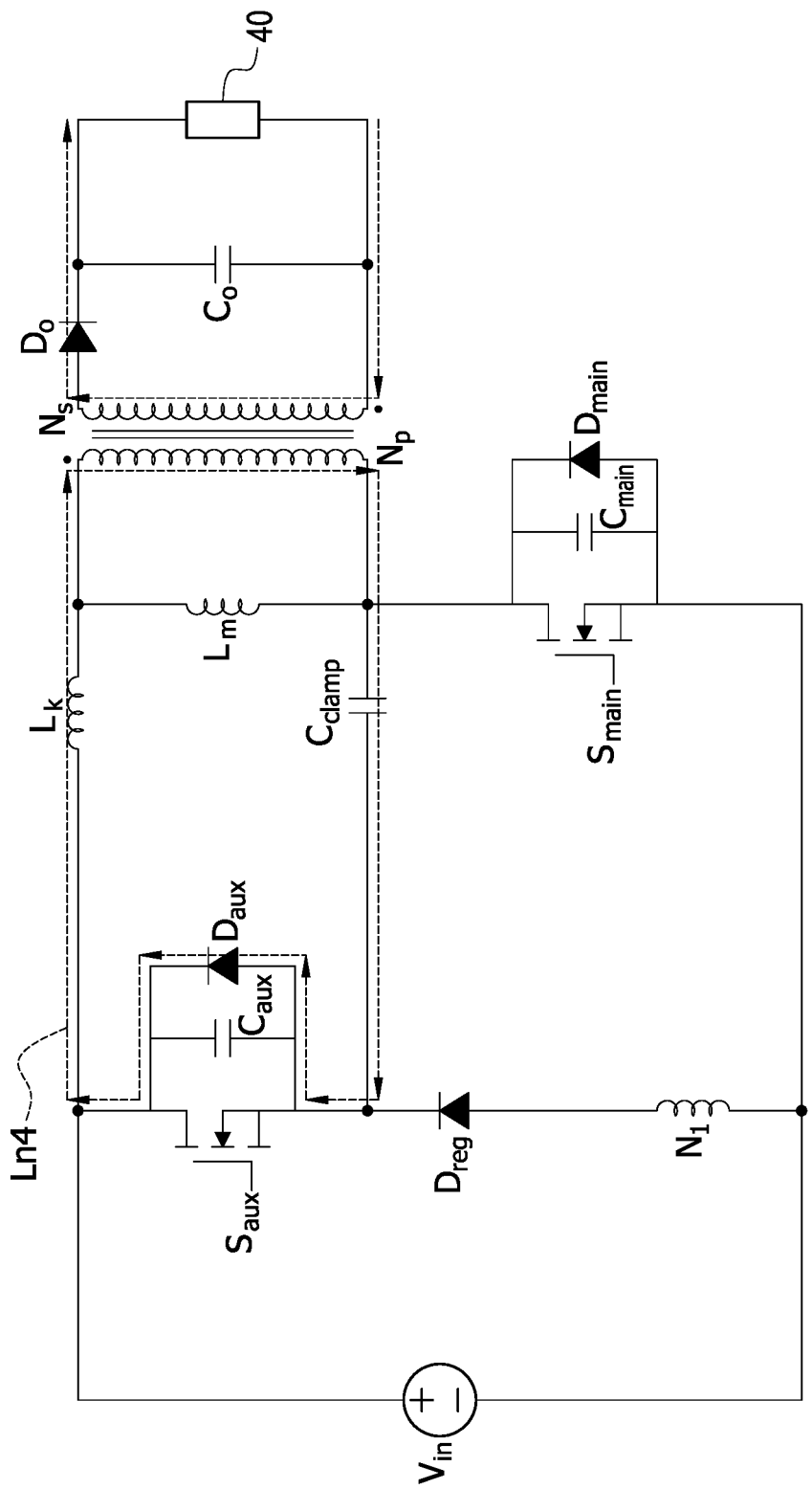
FIG. 12 is a third state diagram of the dual-mode active clamp flyback converter operating under light loading of the present disclosure.

As shown in FIG. 12, when dual-mode active clamp flyback converter in third state under light loading, it is substantially the same as the second state of light loading. The auxiliary switch $S_{aux}$ and the main switch $S_{main}$ are turned off. The leakage inductance $L_k$, the primary-side winding $N_p$, the clamping capacitor $C_{clamp}$, and a body diode $D_{aux}$ parasitic to the auxiliary switch $S_{aux}$ constitute a fourth loop $L_{n4}$. However, the magnetizing inductance $L_m$ starts to release energy to the secondary-side winding $N_s$. At this time, because the energy has been transferred to the secondary-side winding $N_s$, the output diode $D_o$ is turned on, and the output capacitor $C_o$ stores energy.

Figure 13:
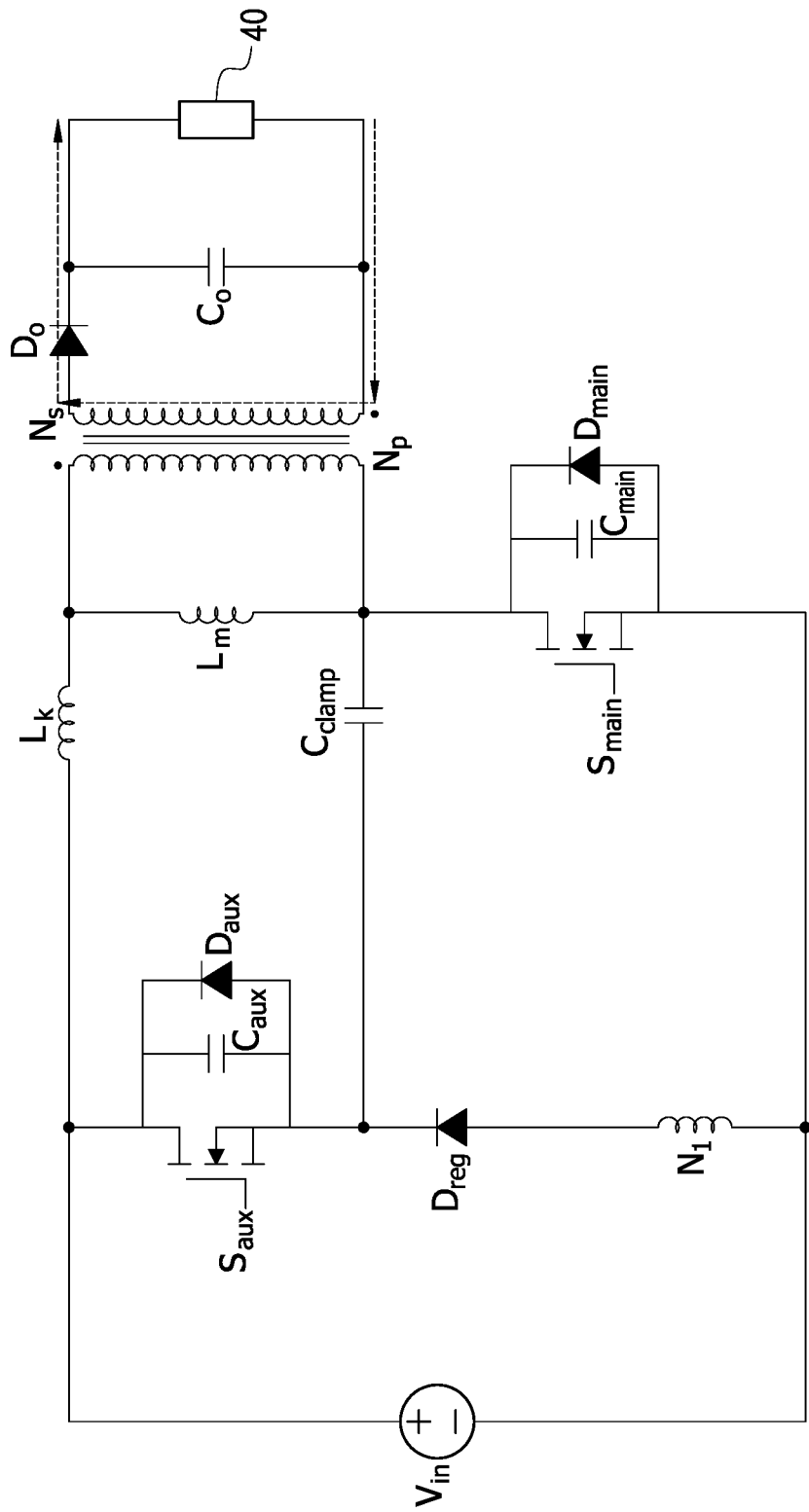
FIG. 13 is a fourth state diagram of the dual-mode active clamp flyback converter operating under light loading of the present disclosure.

As shown in FIG. 13, when dual-mode active clamp flyback converter in fourth state under light loading, it is substantially the same as the third state of light loading. The auxiliary switch $S_{aux}$ and the main switch $S_{main}$ are turned off. However, all energy of the leakage inductance $L_k$ is released, and the energy of the magnetizing inductance $L_m$ continues to release to the secondary-side winding $N_s$.

Figure 14:
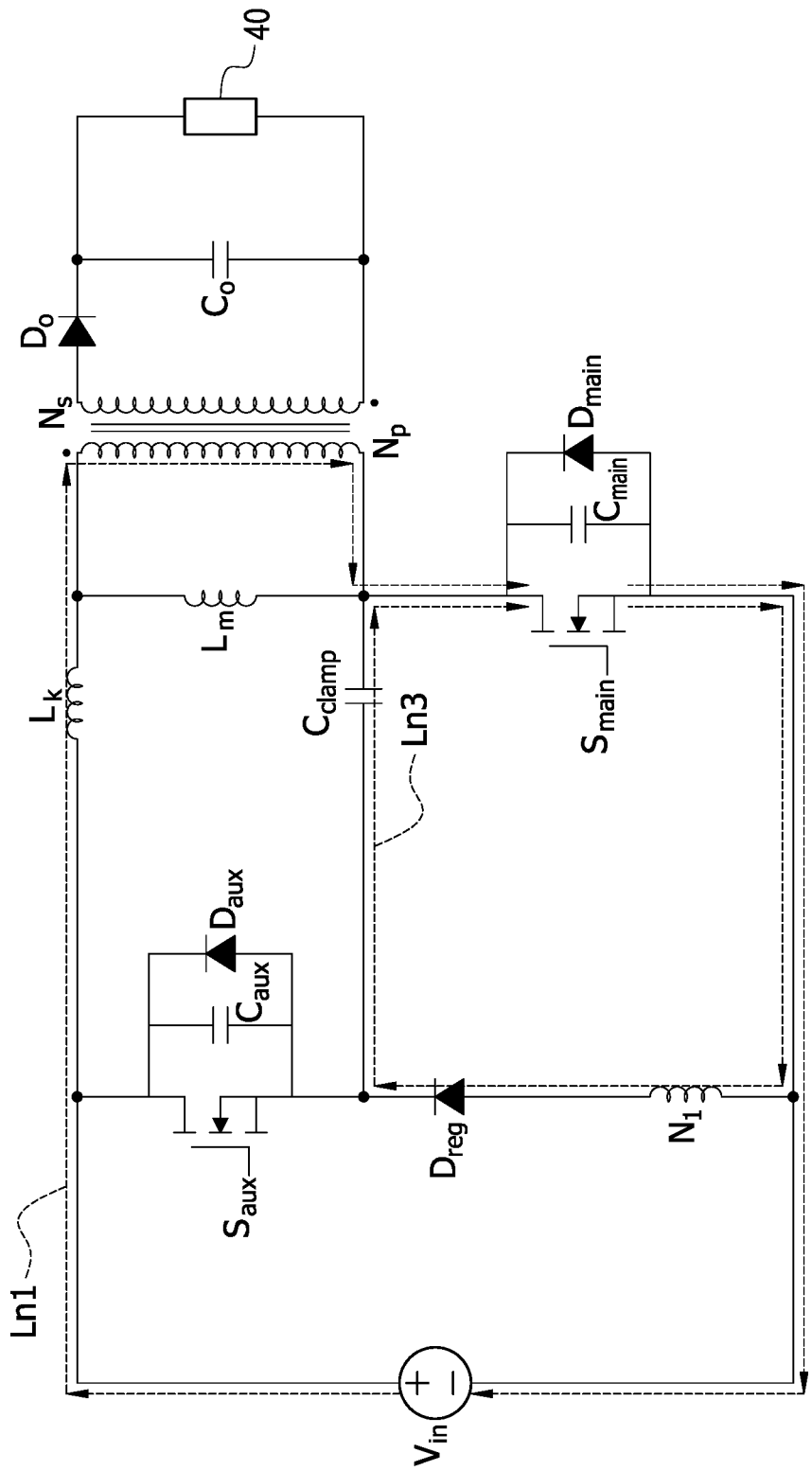
FIG. 14 is a fifth state diagram of the dual-mode active clamp flyback converter operated under light loading of the present disclosure.

As shown in FIG. 14, when dual-mode active clamp flyback converter in fifth state under heavy loading, after the fourth loop $L_{n4}$ is constituted, the auxiliary switch $S_{aux}$ and the main switch $S_{main}$ are turned off, and then the first loop $L_{n1}$ and the third loop $L_{n3}$ are constituted. The input voltage $V_{in}$, the leakage inductance $L_k$, the primary-side winding $N_p$, and the main switch $S_{main}$ constitute the first loop $L_{n1}$. If the clamping capacitor $C_{clamp}$ has temporarily stored energy from the leakage inductance $L_k$, the clamping capacitor $C_{clamp}$, the main switch $S_{main}$, the auxiliary winding $N_l$, and the diode $D_{reg}$ constitute the third loop $L_{n3}$. In the first loop $L_{n1}$, the magnetizing inductance $L_m$ performs magnetization. In the third loop $L_{n3}$, the clamping capacitor $C_{clamp}$ releases energy to the primary-side winding $N_p$ through the auxiliary winding $N_l$. That is, the energy of the leakage inductance $L_k$ temporarily stored in the clamping capacitor $C_{clamp}$ is transmitted to the input end of the transformer circuit 10.

When the dual-mode active clamp flyback converter of the present disclosure is used, first determine whether the load 40 is light loading or heavy loading. If the load 40 is light loading, the clamping energy storage circuit 20 is kept turning off, so the light loading operates in a simple energy recovery action, that is, the energy of the leakage inductance $L_k$ temporarily stored in the clamping capacitor $C_{clamp}$ releases to the primary-side winding $N_p$ of the transformer circuit 10 thought the auxiliary winding $N_l$, which can reduce switching frequencies of the main switch circuit 30 when it operates in valley switching valley voltage switching (VVS) (i.e., fixed frequency modulation mode, FFM mode) to achieve the best conversion efficiency at light loading. If the load 40 is heavy loading, the clamping energy storage circuit 20 enters an active clamp forward (ACF) mode, that is, the auxiliary switch $S_{aux}$ of the clamping energy storage circuit 20 can be turned on and then be turned off, so that the main switch $S_{main}$ of the main switch circuit 30 operates the zero-voltage switching (ZVS) mode for the best conversion efficiency in heavy loading. For this reason, the dual-mode active clamp flyback converter of the present disclosure can automatically switch operating modes for optimized efficiency in response to heavy loading or light loading to solve the technical problem that it is difficult to improve the conversion efficiency, and achieve the purpose of convenient operation, improve conversion efficiency and save power consumption costs.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A dual-mode active clamp flyback converter comprising:
    a transformer circuit coupled to a load, and the transformer circuit including an auxiliary winding,
    a clamping energy storage circuit coupled to the transformer circuit, if the load as a heavy loading, the clamping energy storage circuit configured to turn on, and if the load as a light loading, the clamping energy storage circuit configured to turn off, and
    a main switch circuit coupled to the transformer circuit, when the main switch circuit configured to turn on, the auxiliary winding configured to release energy to a primary-side winding of the transformer circuit,
    wherein, after the clamping energy storage circuit is configured to turn on and then turn off, the main switch circuit is configured to enter a zero-voltage switching mode,
    wherein, the transformer circuit further includes a secondary-side winding coupled to the load, the primary-side winding is coupled in parallel to a magnetizing inductance of the transformer circuit, and is coupled to an input voltage through a leakage inductance of the transformer circuit, wherein, the clamping energy storage circuit includes an auxiliary switch, a clamping capacitor, and a diode that are coupled to each other, the auxiliary switch is coupled to the input voltage and the leakage inductance, the clamping capacitor is coupled to the magnetizing inductance, the primary-side winding, and the main switch circuit, and the diode is coupled to the auxiliary winding.

2. The dual-mode active clamp flyback converter in claim 1, wherein under a condition that inputting a fixed voltage to the transformer circuit, a turning point of a conversion efficiency obtained according to a conversion efficiency ratio of the load coupled to the transformer circuit, when a value of an actual output power is less than a value of an output power corresponding to the turning point of the conversion efficiency, the load as the light loading, when the value of the actual output power is greater than the value of the output power corresponding to the turning point of the conversion efficiency, the load as the heavy loading.

3. The dual-mode active clamp flyback converter in claim 1, wherein the main switch circuit includes a main switch, one end of the main switch is coupled to the primary-side winding, the magnetizing inductance, and the clamping capacitor, the other end of the main switch is coupled to the auxiliary winding and the input voltage.

4. The dual-mode active clamp flyback converter in claim 3, wherein when the auxiliary switch is configured to turn off and the main switch is configured to turn on, the input voltage, the leakage inductance, the primary-side winding, and the main switch constitute a first loop, the input voltage, the leakage inductance, the primary-side winding, the clamping capacitor, the diode and the auxiliary winding constitute a second loop, if the clamping capacitor has temporarily stored energy from the leakage inductance, the clamping capacitor, the main switch, the auxiliary winding, and the diode constitute a third loop; in the first loop, the leakage inductance is configured to perform energy storage, and the magnetizing inductance is configured to perform magnetization; in the second loop, the magnetizing inductance is configured to perform magnetization; in the third loop, the clamping capacitor is configured to release energy to the primary-side winding through the auxiliary winding, when the auxiliary switch and the main switch are configured to turn off, the leakage inductance, the primary-side winding, the clamping capacitor, and a body diode parasitic to the auxiliary switch constitute a fourth loop, in the fourth loop, the leakage inductance is configured to perform energy release, and the magnetizing inductance is configured to perform demagnetization.

5. The dual-mode active clamp flyback converter in claim 4, wherein if the load as the heavy loading, after the fourth loop is constituted, the auxiliary switch is turned on and the main switch is turned off, the leakage inductance, the primary-side winding, the clamping capacitor, and the auxiliary switch constitute a fifth loop, in the fifth loop, the leakage inductance is configured to perform energy storage, and the magnetizing inductance is configured to perform demagnetization.

6. The dual-mode active clamp flyback converter in claim 5, wherein if the load as the heavy loading, after the fifth loop is constituted, the auxiliary switch and the main switch are turned off, the input voltage, the leakage inductance, the primary-side winding, and a body diode parasitic to the main switch constitute a sixth loop, in the sixth loop, the leakage inductance is configured to perform energy release.

7. The dual-mode active clamp flyback converter in claim 6, wherein if the load as the heavy loading, after the sixth loop is constituted, the auxiliary switch is turned off and the main switch is turned on, and then the second loop and the third loop are constituted.

8. The dual-mode active clamp flyback converter in claim 4, wherein if the load as the light loading, after the fourth loop is constituted, the auxiliary switch and the main switch are turned off, and then the first loop and the third loop are constituted.

* * * * *